R. H. McKEE.
PROCESS FOR SEPARATING SULFUR DIOXID FROM GAS MIXTURES.
APPLICATION FILED MAY 26, 1919.

1,387,857.

Patented Aug. 16, 1921.

Inventor:
Ralph H. McKee,
By O. C. Scheffler
Att'y.

R. H. McKEE.
PROCESS FOR SEPARATING SULFUR DIOXID FROM GAS MIXTURES.
APPLICATION FILED MAY 26, 1919.

1,387,857.

Patented Aug. 16, 1921.
2 SHEETS—SHEET 2.

Inventor:
Ralph H. McKee,
By

UNITED STATES PATENT OFFICE.

RALPH H. McKEE, OF NEW YORK, N. Y.

PROCESS FOR SEPARATING SULFUR DIOXID FROM GAS MIXTURES.

1,387,857.

Specification of Letters Patent. Patented Aug. 16, 1921.

Application filed May 26, 1919. Serial No. 299,693.

*To all whom it may concern:*

Be it known that I, RALPH H. McKEE, a citizen of the United States, and a resident of New York, in the county and State of New York, have invented a Process for Separating Sulfur Dioxid from Gas Mixtures, of which the following is a specification.

The object of my invention is to provide a method whereby sulfur dioxid may be separated from its mixtures with other gases, the separation being attained more economically and efficiently than by methods heretofore known, and a further object is to provide apparatus whereby my novel process may be carried out.

Another object of my invention is to utilize in the above process and apparatus an adsorbent for sulfur-dioxid giving an improved result over the adsorbents heretofore used.

The process of my invention consists generally in bringing the mixture of gases containing the sulfur dioxid to a cool and substantially dust-free condition, the moisture content being distinctly below saturation, then bringing the gases into contact with a silica gel of suitable adsorptive qualities, then shutting off the supply of gases to the gel and causing the latter to expel its adsorbed sulfur dioxid.

As applied to the isolation of sulfur dioxid from furnace gases such as gases from pyrite or other sulfid mineral roasters, I may proceed as follows, though it will be obvious that the specific steps recited are only by way of illustration and may be replaced by other operations producing equivalent results. It will also be apparent that in some cases, certain of the steps may be omitted as unnecessary while in others it will be advisable to repeat or multiply some of the steps to such an extent as those skilled in the art will find necessary to bring about the desirable condition in the gas as is set forth above.

The gases are first thoroughly scrubbed with water to cool them and remove the suspended dust, as the latter would soon clog and injure the gel used as adsorbent. After being subjected to this treatment, the gases are still rather warm and almost saturated with water vapor while efficient adsorption by the gel requires that the gases be cooled below 25° C. and that they be distinctly less than saturated with water vapor at their final temperature. I therefore subject the gases from the scrubber to the action of water-cooled surfaces whereby they are further cooled and a portion of the moisture condensed out, and then scrub the cooled gases with strong sulfuric acid to further cool them and remove an additional quantity of water vapor. This completes the preparation of the gases for adsorption, and they next pass to the chamber containing the silica gel.

The silica gel owing to its peculiar physical condition seizes upon the sulfur dioxid with avidity while the diluting gases are unadsorbed and are vented to the atmosphere. When the adsorbent has reached the point where it no longer acts effectively, the gas mixture is shunted to a chamber containing fresh adsorbent and the sulfur dioxid is removed from the saturated gel in substantially pure form by the use of reduced pressure and heat. The method of heating the gel during this operation forms an important part of my invention and will be described later.

The sulfur dioxid discharged from the pump which effects the reduction in pressure may be utilized in any of the ways known in the art. Thus it may be immediately converted into sulfuric acid, bisulfite solutions, etc. or it may be liquefied by the application of pressure in any way heretofore employed.

To more fully illustrate my process and to show an embodiment of the apparatus forming part of my invention, reference is had to the accompanying drawings in which—

Figure 1:
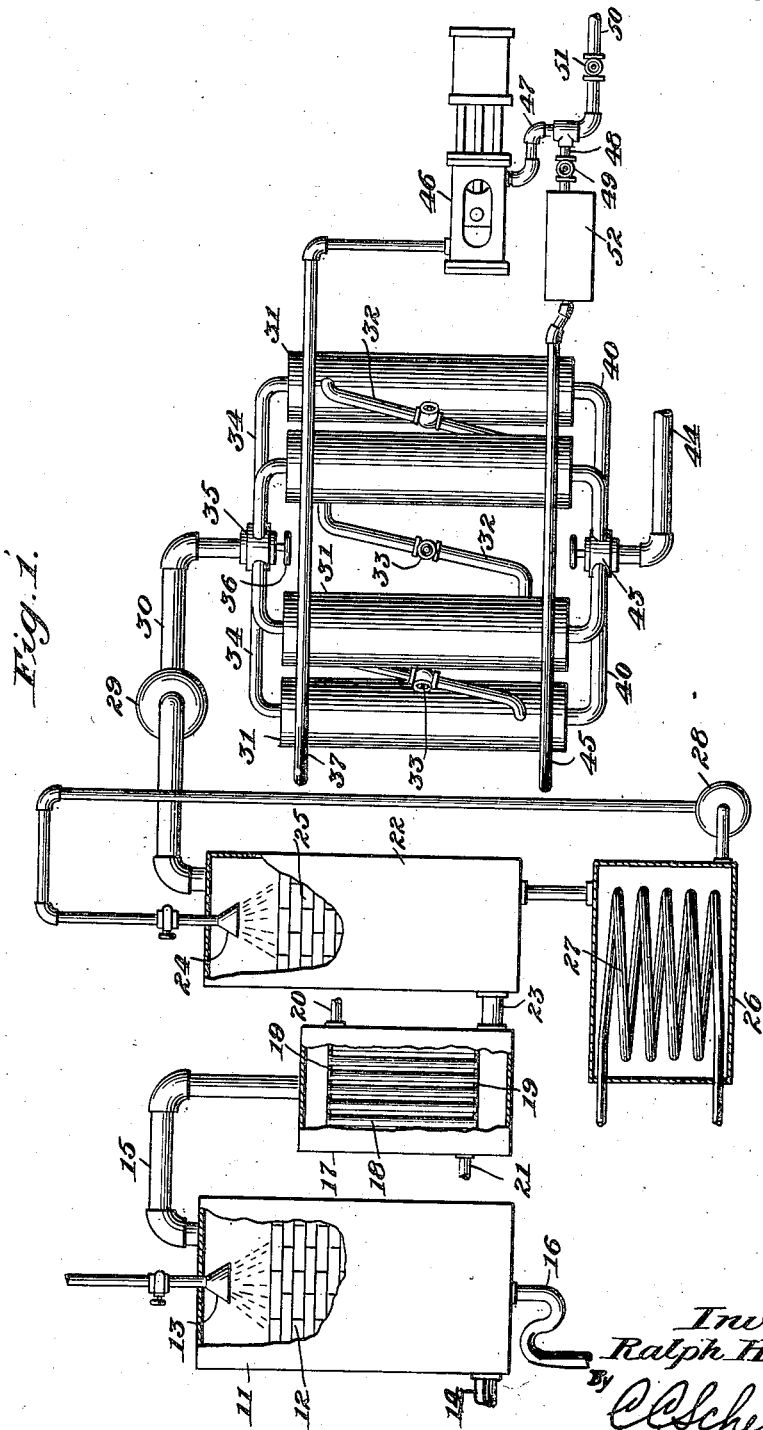
Figure 1 is a side elevation of the complete apparatus.
Figure 2:
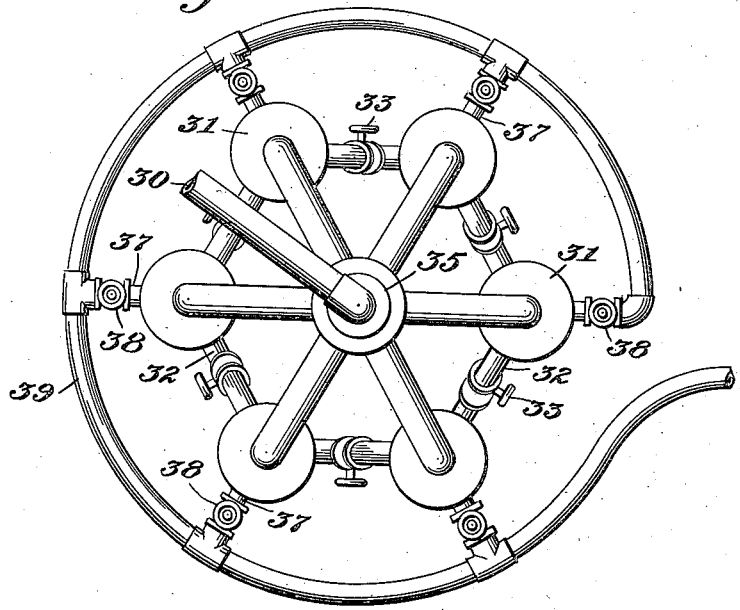
Fig. 2 is a plan view of the adsorbent chambers and their immediate connections, looking downward.
Figure 3:
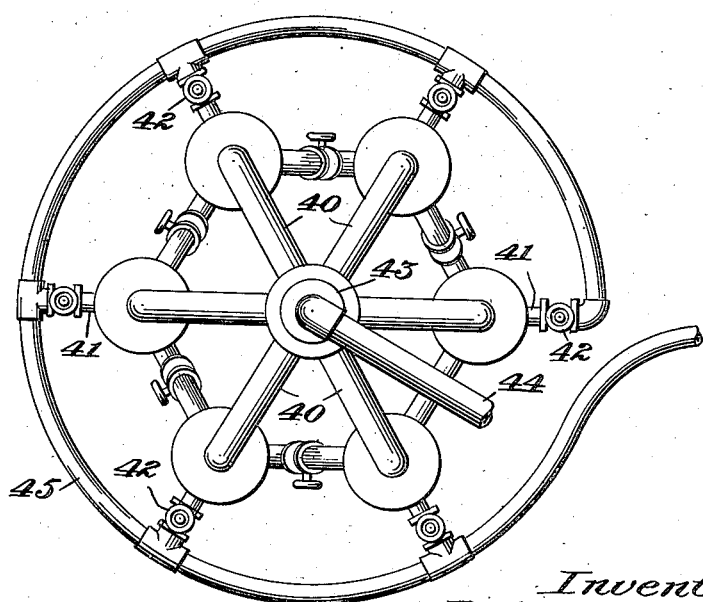
Fig. 3 is a view of the adsorbent chambers looking upward.

In Fig. 1, certain of the connections shown in Figs. 2 and 3 have been omitted for the sake of clearness of illustration.

The apparatus comprises a gas washing tower 11 filled with brick checker work 12 and containing in its upper portion a spray nozzle 13 for introducing a spray of water. The gases from the roaster are admitted to the bottom of the tower through a flue 14, pass upwardly in contact with the wet checker work and descending water and pass from the top of the tower through the conduit 15. The water used for scrubbing the gases collects at the bottom of the tower and is discharged through the trap 16 to the sewer.

From the top of the water-scrubber the gases pass to a cooler 17 which comprises the tubes 18 incased by a jacket and let into the header plates 19. Cooling water is admitted to the jacket at 21 and leaves the same at 20. Some water is condensed in this cooler and as it contains dissolved sulfur dioxid the latter may be recovered if desired by adding this condensate to the water fed to the tower 11 by means of pipe connections not shown.

The cooled gases are discharged from cooler 17 saturated with moisture and in order to remove a portion of this moisture and to further cool the gases, I provide a scrubber 22 to which the gases are led through conduit 23. This scrubber is similar in many respects to water-scrubber 11 but may be much smaller. The liquid used therein is strong sulfuric acid which is sprayed from the nozzle 24 over the checker work 25 as in the water scrubber. The acid collecting at the bottom of scrubber 22 is received in tank 26 in which is located the coil 27 through which a current of cold water is maintained. The cooled acid is raised to the top of the tower by means of pump 28 and recirculated through the tower until it becomes so diluted that it will no longer satisfactorily dehydrate the gases when it is replaced by fresh strong acid. It is obvious that all materials used in this portion of the apparatus must be acid-proof and that the pump 28 may be replaced by any of the known devices for raising acids.

29 indicates a fan which may be placed adjacent the acid tower to furnish the impetus necessary to overcome the friction in the various portions of the apparatus.

After leaving the acid scrubbing tower, the gases are in proper condition to be passed to the adsorbent containers 31. There are preferably several of these so that at least two may be used in series simultaneously for adsorption while one or more others are undergoing the sulfur dioxid releasing operation, and it is desirable to have one or more spare containers to permit repairs to be made or the adsorbent to be replaced without closing down the plant.

I have illustrated a set of six such adsorbent containers but it will be apparent that not only the number but the arrangement of these containers is subject to modification to meet the needs of a particular installation.

In the arrangement shown the adsorbent containers 31 are all of the same structure and are located about the circumference of a circle. The successive vessels considered in a counter-clockwise direction have the connections 32 from the bottom of each vessel to the top of the next one, these connections being provided with the valves 33. The top of each chamber is also connected to a pipe 34 and all the pipes 34 are brought together at the six-way valve 35. The valve 35 contains a sleeve, rotatable by means of the hand-wheel 36 and is so arranged that the pipe 30 leading the gases from the fan 29 may be brought into connection, through a port in the side of the sleeve of the valve, with any one of the pipes 34, all the other pipes 34 being cut off from pipe 30.

The top of each chamber is likewise connected with a pipe 37 and the several pipes 37 are connected with the header or manifold 39. The pipes 37 each contain a valve 38.

The connections at the bottom of the adsorbent chambers are exact duplicates of those at the tops, the radiating pipes 40 corresponding to the top pipes 34 and the connections 41 and valves 42 corresponding to the connections 37 and valves 38. A sleeve valve similar to 35 is provided at 43. The pipe 44 discharges to the atmosphere while the header 45 connected with the pipes 41 is similar in arrangement to header 39 at the tops of the vessels.

Connected with header 39 is a vacuum pump 46 of any suitable construction. The gases passing through the pump discharge through 47 which branches into pipe 48 having valve 49 and pipe 50 having valve 51. Pipe 48 discharges into a heater 52 which is connected at its opposite end with the header 45. The heater 52 may be of any construction which will enable the gases passing through it from the discharge side of the vacuum pump 46 to the header 45 to be heated to the desired temperature. The pipe 50 conducts the sulfur dioxid to the place where it is to be utilized.

In carrying out the process in the above apparatus the gases first pass through the water scrubber 11. A minimum amount of water is used in this apparatus so that it will be discharged at a temperature near its boiling point, thus preventing the loss of sulfur dioxid in solution in the water. The gases will leave this scrubber warm but will be cooled in the cooler 17 and still further cooled in the acid washer 22, so that they will have a temperature below 25° C. on passing to the adsorbent. The dust-free gases, cooled below 25° C. and having a moisture content distinctly below saturation are delivered through pipe 30, and sleeve valve 35 to the desired one of the vessels 31 which will ordinarily contain adsorbent nearly saturated with sulfur dioxid. The gases pass through this vessel and into another which contains fresh adsorbent, or there may be one or more partially saturated vessels between the first and last of the series. The adsorption of the sulfur dioxid is completed by the fresh adsorbent and the barren gases are discharged through sleeve valve 43 and pipe 44 to the atmosphere.

When the first vessel of the series is completely saturated the sleeve valve 35 is adjusted to introduce gases from 30 directly into the vessel which was originally second in the series, the sleeve valve 43 being operated to include an additional fresh chamber at the end of the series and the valves 33 being manipulated in an obvious manner. The saturated vessel is now connected with the vacuum pump by opening one of the valves 38. Under the influence of the reduced pressure, sulfur dioxid is evolved from the adsorbent and passes through the vacuum pump to pipe 47.

Since the sulfur dioxid, in resuming its gaseous state absorbs heat, the adsorbent becomes cooled and the evolution of sulfur dioxid would soon diminish if heat were not supplied from an external source. For this purpose, the valves 49 and 51 are set so that a portion of the discharge from the vacuum pump passes through heater 52, where its temperature is increased. By opening the proper valve 42, the heated sulfur dioxid is introduced into the bottom of the vessel being evacuated and again circulates through this vessel and the pump, thus keeping the adsorbent at the proper temperature. The proportion of the gases so returned is not sufficient to prevent the reduction of pressure down to the required degree. It will be apparent that the heating of the adsorbent to assist in expelling the sulfur dioxid therefrom may be accomplished in other ways as by disposing the adsorbent in tubes and conducting hot gases or steam around the exterior of these tubes while withdrawing the sulfur dioxid or by running steam pipes through the interior of the chamber containing the adsorbent. However, I find that the method in which some of the evolved gas is heated and returned to contact with the adsorbent to be preferable.

The portion of the sulfur dioxid passing from the vacuum pump which is not returned to the adsorbent container will be passed to a compressor for liquefaction according to known methods or passed to any other place where it is desired to use the gas.

It is apparent that the removal of dust from the gases might be in whole or in part effected by means other than a water spray, for example, the dust might be precipitated by passing the gases through a region subjected to the influence of high electrostatic potentials as is now common in cleaning gases from smelters, cement kilns, etc. This would avoid introducing water into the gases and hence the dehydrating steps might be curtailed or eliminated.

The silica gel herein referred to is a product of the action of acids on solutions of alkali metal silicates, the resulting gel being freed from the other reaction products and from some of its water. It is permeated with exceedingly fine pores and shows a high adsorptive power for sulfur dioxid and certain other gases.

I claim:

1. In the process of separating sulfur dioxid from gas mixtures containing the same the steps of adsorbing the sulfur dioxid in a silica gel, maintaining the gel containing sulfur dioxid in an inclosed space and pumping gas therefrom, heating a portion of the gas so removed, and returning it to the space containing the gel.

2. The process of separating sulfur dioxid from gas mixtures containing the same which comprises bringing said gases into contact with a material comprising a silica gel to adsorb sulfur dioxid, cutting off the supply of gases to said adsorbent and reducing the pressure thereover by the use of a pump, heating a portion of the gas discharged from said pump, and passing said heated gas through said adsorbent to assist in expelling sulfur dioxid therefrom.

3. In the process of separating sulfur dioxid from furnace gases, the steps of reducing the temperature of said gases to below 25° C. reducing the dust content to a negligible quantity, and reducing the moisture content to a point materially below saturation, and then bringing the gases into contact with a material containing a silica gel.

4. In the process of separating sulfur dioxid from furnace gases, the steps of scrubbing said gases with water, further cooling said gases, reducing the moisture content of said gases to a point below saturation, and bringing said gases into contact with a material containing a silica gel.

5. The process of separating sulfur dioxid from furnace gases which comprises cooling said gases, removing the dust therefrom, reducing the moisture content of said gases to a point below saturation, bringing said gases into contact with a material comprising a silica gel to adsorb sulfur dioxid, and then removing said sulfur dioxid from said silica gel.

6. In the process of separating sulfur dioxid from furnace gases, the steps of scrubbing said gases with water, further cooling said gases, scrubbing said cooled gases with strong sulfuric acid, and bringing said gases into contact with a material containing a silica gel.

In testimony whereof I hereunto affix my signature.

RALPH H. McKEE.